United States Patent
Oroskar

(10) Patent No.: US 8,457,633 B1
(45) Date of Patent: Jun. 4, 2013

(54) SELECTIVE SIMULTANEOUS COMMUNICATION WITH A WIRELESS COMMUNICATION DEVICE BASED ON CALL TYPE

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 312 days.

(21) Appl. No.: 13/012,548

(22) Filed: Jan. 24, 2011

(51) Int. Cl.
  *H04W 4/00* (2009.01)
(52) U.S. Cl.
  USPC ............ 455/435.2; 455/428; 455/432.1; 455/445; 455/452.2
(58) Field of Classification Search
  USPC .......... 455/405, 412.1–415, 428, 432.1–453, 455/456.1–456.3; 370/232–235, 331–334, 370/352–360
  See application file for complete search history.

(56) References Cited

U.S. PATENT DOCUMENTS

| | | | |
|---|---|---|---|
| 5,778,319 A | 7/1998 | Sawaki | |
| 5,978,463 A | 11/1999 | Jurkevics et al. | |
| 6,069,871 A | 5/2000 | Sharma et al. | |
| 6,223,042 B1 | 4/2001 | Raffel | |
| 6,295,451 B1 | 9/2001 | Mimura | |
| 6,963,750 B1 | 11/2005 | Cheng et al. | |
| 7,177,658 B2 | 2/2007 | Willenegger et al. | |
| 7,349,699 B1 | 3/2008 | Kelly et al. | |
| 7,710,923 B2 * | 5/2010 | Carlton | 370/331 |
| 2004/0037264 A1 | 2/2004 | Khawand | |
| 2004/0125768 A1 | 7/2004 | Yoon et al. | |
| 2005/0003289 A1 | 1/2005 | Fushimi et al. | |
| 2006/0142051 A1 | 6/2006 | Purnadi et al. | |
| 2006/0160551 A1 | 7/2006 | Matoba et al. | |
| 2007/0053336 A1 | 3/2007 | Petrovic et al. | |
| 2007/0115898 A1 * | 5/2007 | Stein | 370/338 |
| 2008/0069073 A1 * | 3/2008 | Sano | 370/342 |
| 2008/0156219 A1 * | 7/2008 | Voss et al. | 102/402 |
| 2009/0016328 A1 | 1/2009 | Peisa et al. | |
| 2009/0061854 A1 | 3/2009 | Gillot et al. | |
| 2009/0156219 A1 * | 6/2009 | Kim et al. | 455/442 |
| 2009/0247137 A1 | 10/2009 | Awad | |
| 2010/0128662 A1 * | 5/2010 | Bye | 370/316 |
| 2010/0260173 A1 * | 10/2010 | Johnson | 370/356 |
| 2011/0216665 A1 * | 9/2011 | Bali et al. | 370/252 |
| 2012/0093169 A1 * | 4/2012 | Stenfelt et al. | 370/401 |
| 2012/0127882 A1 * | 5/2012 | Edwards et al. | 370/252 |
| 2012/0230287 A1 * | 9/2012 | Stenfelt et al. | 370/329 |

OTHER PUBLICATIONS

U.S. Appl. No. 13/012,536, Notice of Allowance dated Dec. 12, 2011.
TIA Standard, "Interoperability Test Specification for cdma2000® Air Interface," TIA-1036, Section 3.11, Jan. 2005.

(Continued)

Primary Examiner — Dai A Phuong

(57) ABSTRACT

During a call, a radio access network (RAN) may substantially simultaneous communicate with a wireless communication device (WCD) via multiple wireless coverage areas. The number of wireless coverage areas used for this substantially simultaneous communication may vary based on the call type. Thus, for instance, if the call type is a real-time call type, the RAN may use more wireless coverage areas when communicating with the WCD to improve the quality of the call. But, if the call type is a non-real-time call type, the RAN may use fewer wireless coverage areas when communicating with the WCD so that wireless resources are conserved.

12 Claims, 9 Drawing Sheets

OTHER PUBLICATIONS

TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001.

3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.50052-A, Version 1.0, Apr. 22, 2005.

U.S. Appl. No. 11/535,870, filed Sep. 27, 2006.
Office Action from U.S. Appl. No. 11/535,870, dated Apr. 3, 2009.
Office Action from U.S. Appl. No. 11/535,870, dated Nov. 12, 2009.
Office Action from U.S. Appl. No. 11/535,870, dated Feb. 18, 2010.

* cited by examiner

SELECTIVE SIMULTANEOUS COMMUNICATION WITH A WIRELESS COMMUNICATION DEVICE BASED ON CALL TYPE

REFERENCE TO RELATED APPLICATION

This application is related to a co-pending application entitled "Selective Simultaneous Communication with a Wireless Communication Device Based on Location and Mobility," filed on the same day as this application with Ser. No. 13/012,536, the entirety of which is hereby incorporated by reference.

BACKGROUND

Some types of wireless network technologies, such as Code Division Multiple Access (CDMA) technologies, allow a wireless communication device (WCD) to communicate with a radio access network (RAN) substantially simultaneously via multiple wireless coverage areas. This substantially simultaneous communication may occur either during call establishment or after a call has been established.

During call establishment, the RAN may transmit more than one channel assignment message to the WCD. Each of these channel assignment messages may be transmitted via a different wireless coverage area. In this way, the probability that the WCD receives at least one channel assignment message is increased.

Once a call has been established, the RAN may transmit copies of the same bearer data to the WCD via traffic channels from each of several wireless coverage areas. This approach can increase the likelihood that the WCD will receive at least one copy of the bearer data. Additionally, the WCD may be able to combine two or more received copies of the bearer data such that the WCD can decode the received bearer data more reliably than if the WCD received only one copy of the bearer data. An analogous procedure may be used for bearer data transmitted by the WCD.

OVERVIEW

By engaging in substantially simultaneous communication with a WCD, the RAN may be able to provide better wireless service to WCDs that are in motion and/or WCDs that are establishing or engaged in particular types of call. For example, as a WCD moves from place to place, the WCD may be handed off from one wireless coverage area to another. By communicating with a WCD substantially simultaneously via more than one wireless coverage area, it is more likely that the WCD will properly transmit and/or receive information. Similarly, if a WCD is engaged in a real-time call, such as interactive voice or video, the user experience of the call may improve if the RAN communicates with the WCD substantially simultaneously via more than one wireless coverage area.

However, a potential downside of a WCD and a RAN engaging in this substantially simultaneous communication is that the communication requires use of more wireless air interface resources than non-simultaneous communication. For example, if the RAN substantially simultaneously transmits multiple channel assignment messages to the WCD, each via a different wireless coverage area, control channel resources of each of these wireless coverage areas are used. Similarly, if the RAN substantially simultaneously transmits copies of the same bearer data to the WCD, each copy via a traffic channel from a different wireless coverage area, traffic channel resources in each of these wireless coverage areas are used. Thus, excessive use of substantially simultaneous communication may have a deleterious impact on the resource utilization of the RAN. Therefore, it behooves the RAN to be able to determine when a WCD is unlikely to benefit from substantially simultaneous communication, and in response to this determination, reduce the degree of substantially simultaneous communication between the RAN and this WCD.

For instance, if the WCD is not in motion, or moving about only to a limited extent, it may be advantageous for the RAN to communicate with the WCD via a small number of wireless coverage areas (e.g., only one or two). When the WCD's motion is limited in this way, it is unlikely that the WCD will experience a handoff to a different wireless coverage area. Therefore, the benefits of substantially simultaneously communicating with the WCD via a large number of wireless coverage areas would likely be minimal.

Accordingly, in a first example embodiment, a RAN may obtain a velocity measurement of a WCD. If the obtained velocity measurement meets a velocity threshold (e.g., the WCD's velocity is above a given speed), the RAN may select a first set of wireless coverage areas. However, if the obtained velocity measurement does not meet the velocity threshold (e.g., the WCD's velocity is at or below the given speed), the RAN may select a second set of wireless coverage areas. The second set of wireless coverage areas may be smaller than the first set of wireless coverage areas.

Then, if the selected set of wireless coverage areas consists of one wireless coverage area, the RAN may communicate with the WCD via the one wireless coverage area. On the other hand, if the selected set of wireless coverage areas consists of more than one wireless coverage area, the RAN may communicate with the WCD substantially simultaneously via each wireless coverage area in the selected set. The substantially simultaneous communication may involve the RAN transmitting channel assignment messages to the WCD and/or the RAN exchanging bearer data with the WCD.

In a second example embodiment, a RAN may determine that a first extent of wireless coverage areas is available for facilitating substantially simultaneous communication with a WCD. The RAN may also determine that the WCD has been substantially stationary for a period of time. Then, in response to determining that the WCD has been substantially stationary for the period of time, the RAN may communicate with the WCD via a second extent of wireless coverage areas. The second extent of wireless coverage areas may be a subset of the first extent of wireless coverage areas. Particularly, if the second extent of wireless coverage areas consists of one wireless coverage area, the RAN may communicate with the WCD via the one wireless coverage area. But, if the second extent of wireless coverage areas consists of more than one wireless coverage area, the RAN may communicate with the WCD substantially simultaneously via each wireless coverage area in the second extent.

Additionally, if the RAN is engaged in or attempting to establish a non-real-time call with a WCD, it also may be advantageous for the RAN to communicate with the WCD via a small number of wireless coverage areas (e.g., only one or two). Unlike real-time calls, non-real-time calls tend to have more elastic quality requirements, as moderate amounts of delay and loss are more tolerable on these types of calls. Therefore, the benefits of substantially simultaneously communicating with WCD via a large number of wireless coverage areas are less likely to be realized for non-real-time calls.

Accordingly, in a third example embodiment, a RAN may receive, from a wireless communication device (WCD), a request to establish a call of a given call type. The RAN may define a plurality of wireless coverage areas. If the given call type is a real-time call type, the RAN may select a first set of wireless coverage areas from the plurality. However, if the given call type is a non-real-time call type, the RAN may select a second set of wireless coverage areas from the plurality. The second set of wireless coverage areas may be smaller than the first set of wireless coverage areas.

Particularly, if the selected set of wireless coverage areas consists of one wireless coverage area, the RAN may communicate with the WCD via the one wireless coverage area. But, if the selected set of wireless coverage areas consists of more than one wireless coverage area, the RAN may communicate with the WCD substantially simultaneously via each wireless coverage area in the selected set.

In a fourth example embodiment, a RAN may determine that a first extent of wireless coverage areas is available for facilitating substantially simultaneous communication with a WCD. The RAN may receive, from the WCD, a request to establish a call of a given call type. Based on the given call type, the RAN may communicate with the WCD via a second extent of wireless coverage areas. The second extent of wireless coverage areas may be a subset of the first extent of wireless coverage areas.

If the second extent of wireless coverage areas consists of one wireless coverage area, the RAN may communicate with the WCD via the one wireless coverage area. However, if the second extent of wireless coverage areas consists of more than one wireless coverage area, the RAN may communicate with the WCD substantially simultaneously via each wireless coverage area in the second extent.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
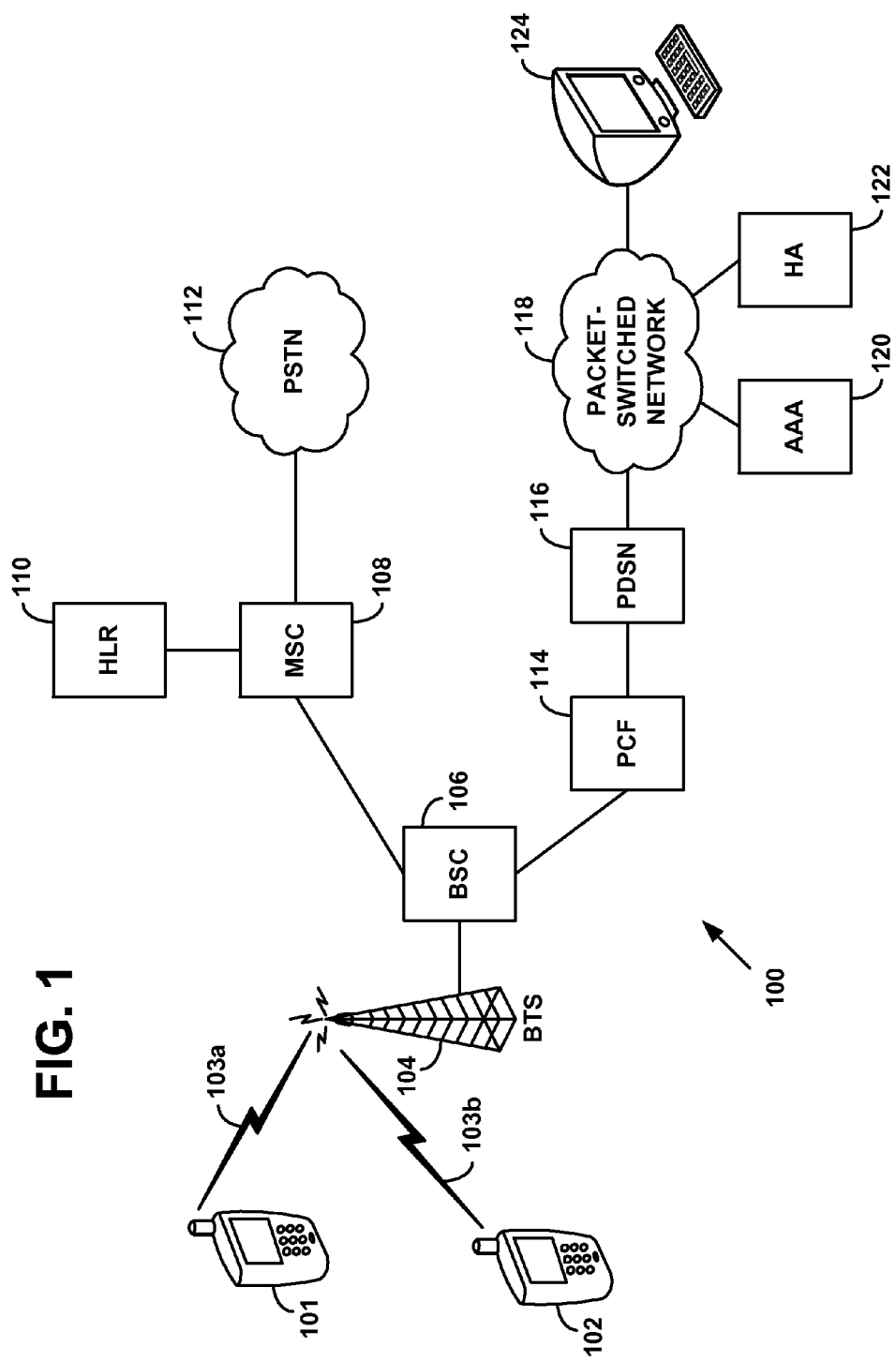
FIG. 1 depicts a RAN, in accordance with an example embodiment.

FIG. 1 is a simplified block diagram of a wireless communication system 100 in which example embodiments can be employed. WCD 101 may communicate over an air interface 103a with a base transceiver station (BTS) 104, which is, in turn, coupled to or integrated with a base station controller (BSC) 106. Similarly, WCD 102 may communicate over an air interface 103b with BTS 104. Transmissions over air interface 103a from BTS 104 to WCD 101 and over air interface 103b from BTS 104 to WCD 102 may represent "forward links" to the WCDs. Conversely, transmissions over air interface 103a from WCD 101 to BTS 104 and over air interface 103b from WCD 102 to BTS 104 may represent "reverse links" from the WCDs.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. As represented by its connection to public-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a Mobile Internet Protocol (mobile-IP) home agent (HA) 122, and a remote computer 124.

After acquiring a traffic channel over air interface 103a, WCD 101 may transmit a request to PDSN 116 for a connection to the packet data network. Then, following authentication of WCD 101 by AAA server 120, WCD 101 may be assigned an IP address by the PDSN or by HA 122, and may thereafter engage in packet-data communications with entities such as remote computer 124. Similar procedures may take place, via air interface 103b, for WCD 102.

Figure 2:
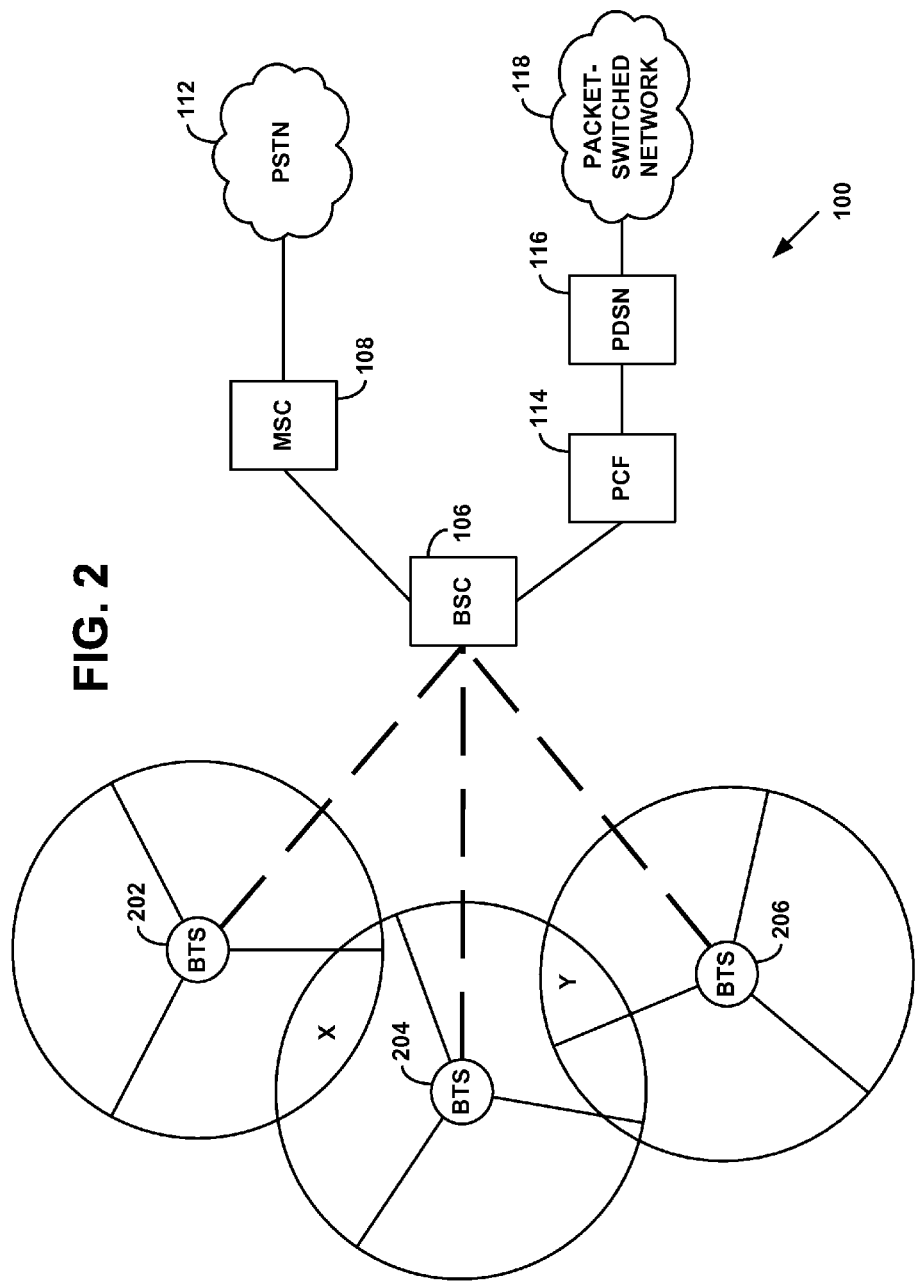
FIG. 2 depicts a RAN with several wireless coverage areas, in accordance with an example embodiment.

In practice, a BSC may serve multiple BTSs, each of which may define one or more wireless coverage areas. An example of such an arrangement is illustrated in FIG. 2, which shows BSC 106 in network 100 coupled with BTSs 202, 204, and 206. Each BTS is shown at the core of a respective circle representing wireless coverage, with each circle divided into three pie-shaped pieces representing individual wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas per BTS in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, a BTS's overall wireless coverage may not be circular, and may take on other shapes and arrangements instead.

A WCD may receive the same bearer data simultaneously from more than one wireless coverage area (herein the term "bearer data" inclusively refers to any form of circuit-switched or packet-switched voice, video, audio, text, graphics, or other type of information). To illustrate how this may occur, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1 and 2 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
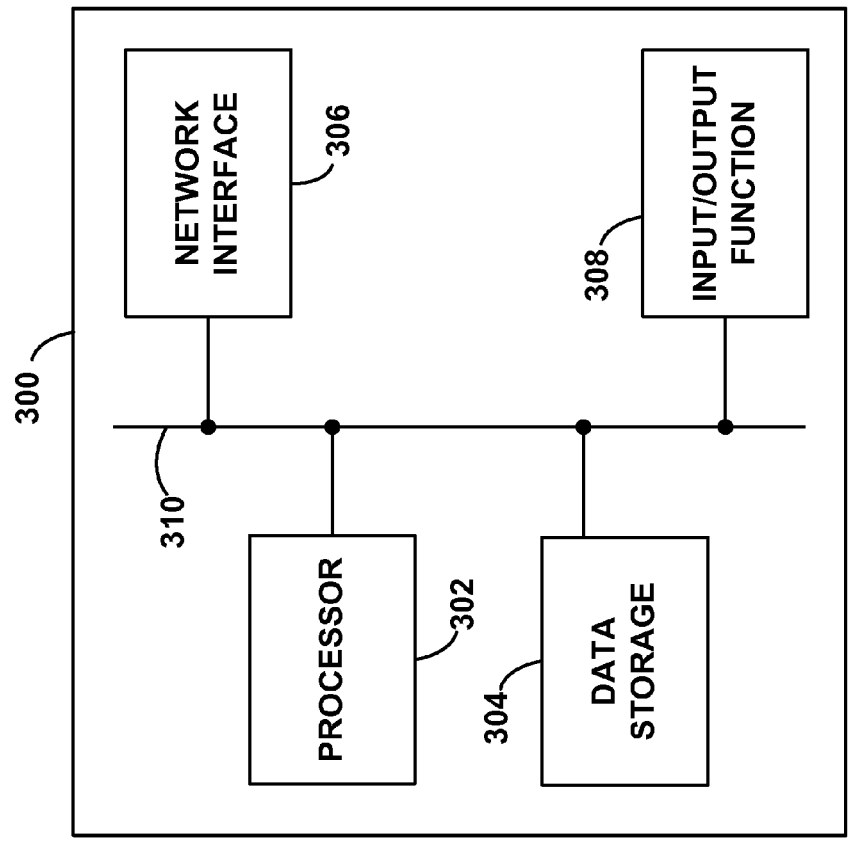
FIG. 3 is a block diagram of a RAN component, in accordance with an example embodiment.

FIG. 3 is a simplified block diagram exemplifying a RAN component 300, illustrating some of the functional elements that may be found in a RAN arranged to operate in accordance with the embodiments herein. RAN component 300 could be any type of device found in or associated with a RAN, such as a BTS, a BSC, or an MSC. For purposes of illustration, this specification may equate RAN component 300 to a BSC from time to time. Nonetheless, it should be understood that the description of RAN component 300 could apply to any component used for the purposes described herein.

RAN component 300 may include a processor 302, a data storage 304, a network interface 306, and an input/output function 308, all of which may be coupled by a system bus 310 or a similar mechanism. Processor 302 may include one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 may store program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. Therefore, data storage 304 may be a non-transitory computer-readable medium, having stored thereon program instructions that, if executed by a computing device, cause the computing device to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN component 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN component 300 may support remote access from another device, via network interface 306 or via another interface (not shown), such an RS-232 or Universal Serial Bus (USB) port.

II. CDMA Communications

The present invention will be described by way of example with reference to Code Division Multiple Access (CDMA) communications. However, it should be understood that the invention can apply to other families of protocols now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be assigned dynamically to WCDs for use as traffic channels.

a. Soft Handoff

During a call, a WCD may communicate via a number of "active" wireless coverage areas at a time. Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion).

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

To facilitate a determination of which wireless coverage areas should be in the WCD's active and candidate sets, each BTS may emit a pilot channel signal per each wireless coverage area the respective BTS defines. The WCD may constantly, or from time to time, measure the strength of each pilot channel signal that it receives and may notify the RAN when a received pilot strength is above or below designated thresholds.

More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))
T_COMP: Difference in signal strength from an active set pilot (e.g., 2 dB)
T_DROP: Threshold pilot strength for removal from the active set (e.g., −16 dB)
T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

b. Idle Handoff and Call Establishment

Given the benefits of rapid and reliable assignment of one or more traffic channels to a WCD, especially when a WCD is in motion, at least two techniques can be used. The first involves the RAN substantially simultaneously transmitting channel assignment messages to the WCD via multiple wireless coverage areas. The second involves the RAN using channel assignment messages to assign traffic channels from multiple wireless coverage areas during call establishment. Then, the RAN would be able to substantially simultaneously communicate bearer data with the WCD via multiple wireless coverage areas.

Herein, the term "substantially simultaneously" may be used to describe communications involving two or more discrete messages that pass through two or more different intermediate points at approximately the same time. Thus, for example, a RAN substantially simultaneously transmitting channel assignment messages to a WCD via multiple wireless coverage areas may involve the RAN transmitting n channel assignment messages, each via a different one of n wireless coverage areas, to the WCD. These n transmissions may all occur within a relatively short period of time, such as a few tens of milliseconds or less.

Regardless, in order to appreciate these techniques, it is helpful to consider how the RAN communicates with a WCD that is idle (i.e., not exchanging bearer data with the RAN). In particular, a RAN and/or WCD may perform an idle handoff between wireless coverage areas, and may also establish and incoming or outgoing call in which the WCD participates.

An idle WCD may register with a primary wireless coverage area, and listen to the paging channel of the primary wireless coverage area for incoming call indications, and other information, from the RAN. The RAN may transmit system parameter messages and/or neighbor list update messages to the WCD via this primary paging channel. These messages may contain PN offsets of the pilot channels emitted by BTSs that define neighboring wireless coverage areas (e.g., wireless coverage areas defined by the RAN's BTSs or wireless coverage areas defined by nearby BTSs in different RANs). Similar to an active WCD, an idle WCD may measure the pilot channel signal strength that it receives from each of these neighboring wireless coverage areas.

If, for some period of time, WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and register with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

c. Substantially Simultaneous Transmission of Control Traffic

Figure 4:
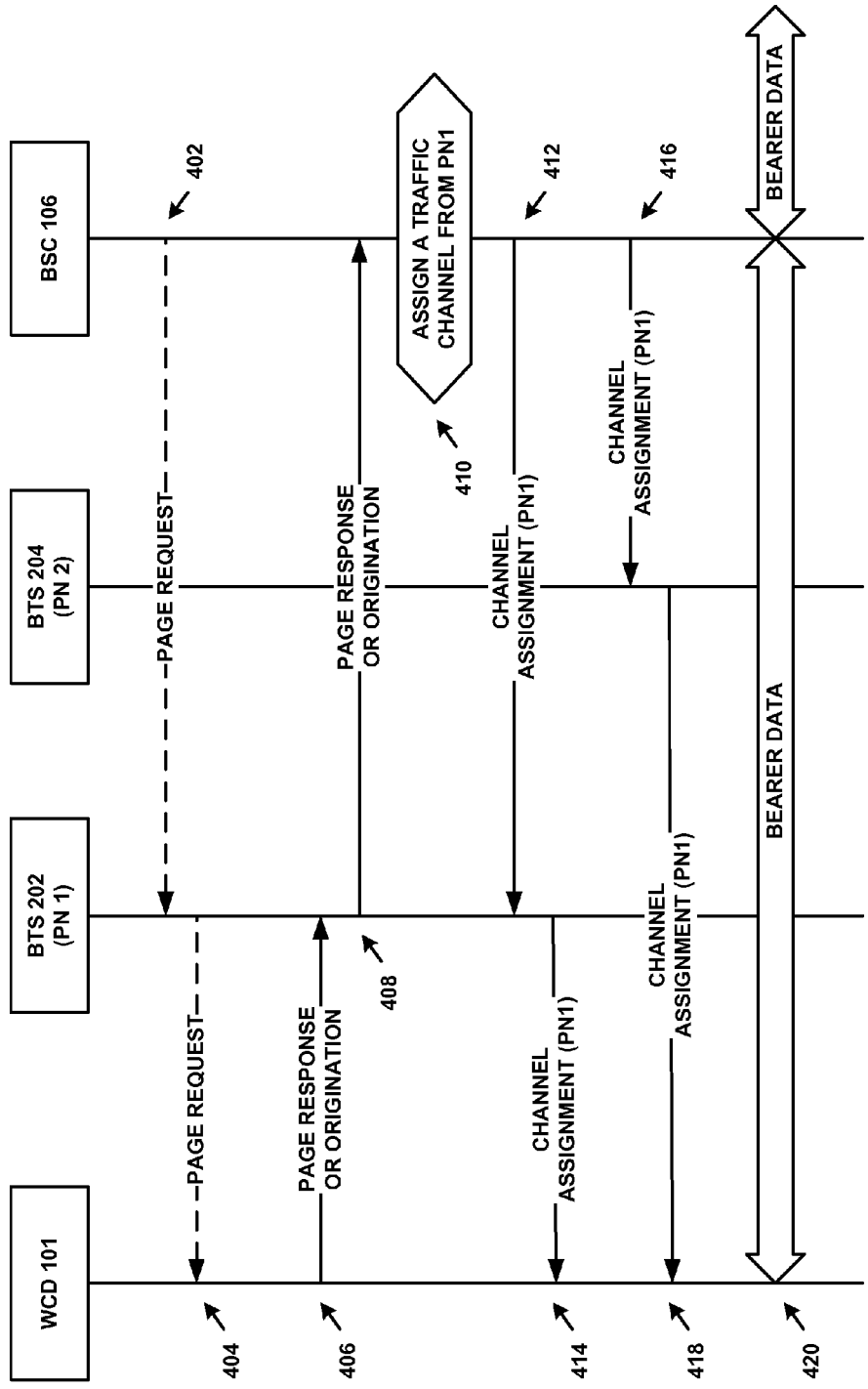
FIG. 4 is a first message flow, in accordance with an example embodiment.

For purposes of illustration, FIG. 4 shows an example message flow 400 of a RAN transmitting channel assignment messages via multiple wireless coverage areas during call establishment. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). BTS 202 and BTS 204 are controlled by BSC 106. WCD 101 may be able to receive pilot channel signals of sufficient strength from both PN 1 and PN 2 such that WCD could communicate effectively via either of these wireless coverage areas. Without loss of generality, it is assumed that PN 1 is the primary wireless coverage area of WCD 101.

Preferably, WCD 101 reports, to BSC 106, measurements of the signal strengths at which WCD 101 receives the pilot channels of PN 1 and PN2. This reporting may occur through the transmission of radio environment reports or pilot strength measurement messages (PSMMs), or via a different type of message.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 attempts to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign a traffic channel to WCD 101. In a possible scenario, BSC 106 may assign a traffic channel from PN 1. When making the traffic channel assignment, BSC 106 may consider pilot channel signal strength measurements that it received from WCD 101. BSC 106 may use these received signal strengths, and/or other information, when determining from which wireless coverage area to assign a traffic channel. Thus, if BSC 106 determines that WCD 101 receives the pilot signal from PN 1 at a lower strength than that of PN 2, BSC 106 may instead assign a traffic channel from PN 2 to WCD 101.

At steps 412 and 414, BSC 106 may transmit a first channel assignment message via BTS 202 to WCD 101. The first channel assignment message may include a traffic channel assignment for PN 1. In other words, the first channel assignment message may instruct WCD 101 to use a particular Walsh code to receive from PN 1. Similarly, at steps 416 and 418, BSC 106 may transmit a second channel assignment message via BTS 204 to WCD 101. The second channel assignment message may also include a traffic channel assignment for PN 1. By transmitting multiple channel assignment messages to WCD 101, the likelihood that WCD 101 receives at least one of these messages is increased. Regardless, at step 420, WCD 101 may begin receiving bearer traffic via BTS 202 (using PN 1).

While message flow 400 shows only two channel assignment messages being transmitted to WCD 101, more or fewer channel assignment messages may be transmitted to WCD 101 without departing from the scope of the invention. Further, throughout message flow 400, the names of these messages are used for purposes of convenience and messages with other names may be used for similar purposes.

d. Substantially Simultaneous Transmission of Bearer Data

As described in Section IIa, when the RAN substantially simultaneously communicates bearer data with a WCD via more than one wireless coverage area, the RAN and WCD may be able to engage in soft handoff procedures. Soft handoff may result in fewer dropped calls and a higher overall call quality, especially if the WCD is in motion.

Channel Assignment into Soft Handoff (CASHO) has been proposed as a way of assignment multiple traffic channels from different wireless coverage areas to a WCD during call establishment. Thus, using CASHO procedures may increase the reliability and quality of the initial portions of the calls.

Figure 5:
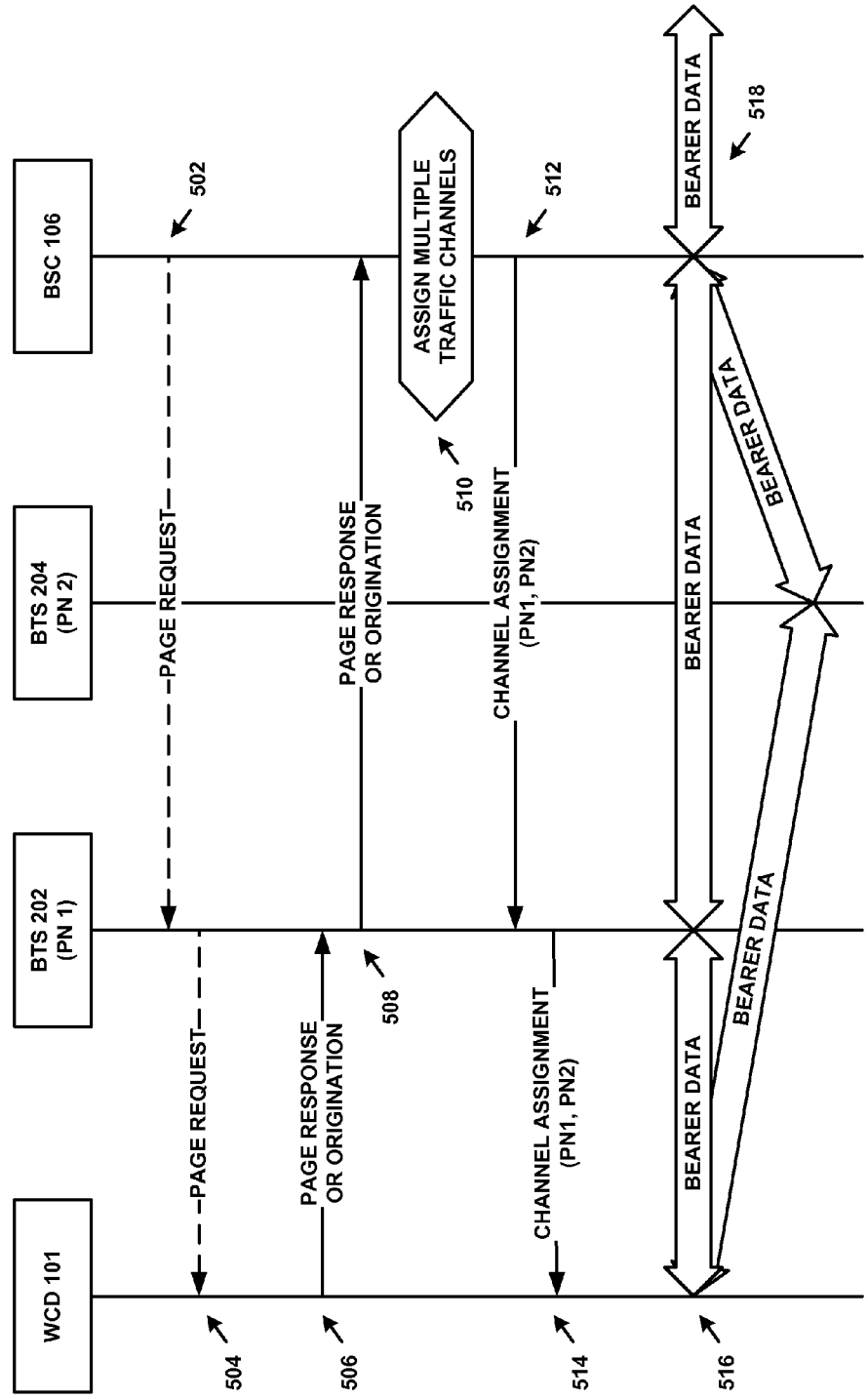
FIG. 5 is a second message flow, in accordance with an example embodiment.

Also for purposes of illustration, FIG. 5 shows an example message flow 500 of a RAN and WCD engaging in CASHO procedures. Like FIG. 4, FIG. 5 involves WCD 101, BTS 202, BTS 204, and BSC 106.

Steps 502 and 504 illustrate BSC 106, via BTS 202, transmitting an optional page request message to WCD 101. Steps 506 and 508 illustrate WCD 101 transmitting a page response message or origination message via BTS 202 to BSC 106. At step 510, BSC 106 may assign multiple traffic channels to WCD 101. In particular, BSC 106 may assign one traffic channel from PN 1, and another traffic channel from PN 2, to WCD 101, in accordance with CASHO procedures. When making the traffic channel assignment, BSC 106 may consider pilot channel signal strength measurements that it received from WCD 101. BSC 106 may receive these signal strengths in radio environment reports or PSMMs, the page response or origination message of steps 506 and 508, or in some other type of message. In any case, BSC 106 may use these received signal strengths, and/or other information, when determining whether and/or how to perform CASHO procedures.

At steps 512 and 514, BSC 106 may transmit a channel assignment message via BTS 202 to WCD 101. The channel assignment message may include traffic channel assignments for both PN 1 and PN 2. In other words, the channel assignment message may instruct WCD 101 to use a particular Walsh code with PN 1 and another Walsh code with PN 2. Accordingly, at steps 516 and 518, WCD 101 may begin transmitting and receiving bearer data via both BTS 202 (using PN 1) and BTS 204 (using PN 2). Thus, via both BTS 202 and BTS 204, WCD 101 may receive forward direction bearer data streams from BSC 106, and may combine these streams into a single stream of bearer data. For example, WCD 101 may add the received signals from BTS 202 and BTS 204. Conversely, via both BTS 202 and BTS 204, BSC 106 may receive reverse direction bearer data streams from WCD 101, and may also combine these streams into a single stream of bearer data.

It should be understood that rather than traversing BTS 202, any of the page request messages, page response or origination messages, channel assignment messages may instead traverse BTS 204, or both BTS 202 and BTS 204. Alternatively, BSC 106 may assign WCD 101 traffic channels from two different PNs defined by the same BTS. Further, the names of these messages are used for purposes of convenience and messages with other names may be used for similar purposes. Additionally, CASHO procedures may be performed such that more than two traffic channels are assigned to a WCD during call initiation.

III. Determining the Extent of Substantially Simultaneous Communication

Transmitting channel assignment messages via multiple wireless coverage areas generally improves the success rates of call establishment, and CASHO generally improves call quality during the initial portion of a call. The more wireless coverage areas used for substantially simultaneous communication during channel assignment or CASHO procedures, the greater the potential benefit to the WCD.

However, as noted above, a possible downside of a WCD and a RAN engaging in this substantially simultaneous communication is that the communication requires use of more wireless air interface resources than non-simultaneous communication. For example, when the RAN substantially simultaneously transmits multiple channel assignment messages to the WCD, each via a different wireless coverage area, control channel resources of each of these wireless coverage areas are used. For CASHO, when the RAN substantially simultaneously transmits copies of the same bearer data to the WCD, each copy via a traffic channel from a different wireless coverage area, traffic channel resources in each of these wireless coverage areas are used. Thus, excessive use of substantially simultaneous communication may have a deleterious impact on the resource utilization of the RAN. Therefore, it behooves the RAN to be able to determine when a WCD is unlikely to benefit from substantially simultaneous communication, and in response to this determination, reduce the degree of substantially simultaneous communication between the RAN and this WCD.

a. Based on WCD Location and/or Mobility

An idle WCD that is in a substantially stationary position, or just moving slowly, may be unlikely to benefit from substantially simultaneous communication. In particular, such a WCD is less likely to be handed off than a WCD that is moving more rapidly. Further, any pilot channel signal strength reports that the RAN receives from the WCD may be accurate for a longer period of time than those from a WCD that is moving more rapidly. Thus, the RAN is likely to have a more accurate assessment of the WCD's wireless coverage. Therefore, any wireless coverage area resources assigned to the WCD are more likely to provide sufficient service to the WCD than if the WCD were moving more rapidly.

Accordingly, a possible aspect of the embodiments herein is to determine whether a WCD is substantially stationary or moving slowly. If this is the case, the RAN may reduce the extent of substantially simultaneous communication with the WCD in order to conserve wireless resources. On the other hand, if the RAN is moving more rapidly, the RAN may increase the extent of substantially simultaneous communication with the WCD in order to improve call quality. By maintaining an approximately inversely proportional relationship between WCD movement and the extent of substantially simultaneous communication with the WCD, the RAN may be able to reduce wireless resource utilization when the WCD is unlikely to benefit from substantially simultaneous communication, but increase the call quality when the WCD is likely to experience handoffs.

The magnitude of this potential improvement may be significant. Of the hundreds of millions of WCDs in use, many spend a majority of each day in a substantially stationary location. For example, many individuals tend to spend most of their time in a small number of geographical locations. Some individuals may spend half of each day, or more, at their residences. Others may spend approximately this much time at their residences, and a similar amount of time at their workplaces. Aside from residences and workplaces, there may be a number of locations (perhaps a small number) that individuals tend to spend time at, such as a friend's residence, a relative's residence, or a favorite restaurant. However, the embodiments herein may be used with any geographical location that a WCD enters, and is not limited to just residences, workplaces, and so on.

Therefore, in some embodiments, the RAN, or some other entity, may record the geographical locations at which the WCD tends to remain relatively fixed. If the WCD remains relatively fixed in a particular geographical location for a duration of, for instance, 1 minute, 15 minutes, 30 minutes, or one hour, the geographical location may be recorded. Then, when the WCD moves about in the future, the RAN may access the recorded geographical locations to determine whether the WCD enters the proximity of a recorded geographical location. If the WCD enters such a proximity, the RAN may assume that the WCD is going to remain in that proximity for a period of time, and proactively reduce the number of wireless coverage areas that the RAN uses to substantially simultaneously communicate with the WCD. Conversely, if the WCD determines that the RAN has left the proximity of a recorded geographical location, the RAN may assume that the WCD is going to be in motion for a period of time, and may proactively increase the number of wireless coverage areas that the RAN uses to substantially simultaneously communicate with the WCD.

The RAN, or another entity, may store the recorded geographical locations of the WCD. This storage may take the form of a list, a hash table, a mapping, or any other arrangement that associates the WCD with the recorded geographical locations. Each recorded geographical location may be stored with additional information, such as the amount of time that the WCD has spent in the respective recorded geographical location, and/or how long ago the WCD was in the proximity of the respective recorded geographical location. The recorded geographical locations may be sorted, indexed, or arranged according to any one or more of pieces of additional information.

TABLE 1

Geographical locations and associated information.

| Global Positioning System (GPS) Coordinates of Location | Length of Time at Location | Time Since Most Recent Visit |
|---|---|---|
| 41.8788-87.6367 | 7,200 seconds | 600 seconds |
| 41.7054-88.0735 | 14,400 seconds | 6,000 seconds |
| 41.7390-88.0540 | 60 seconds | 86,400 seconds |

Table 1 provides example geographical locations and associated information for a hypothetical WCD. The first entry indicates that the WCD was at location 41.8788-87.6367 for 7,200 seconds (2 hours), but left this location 600 seconds (10 minutes) ago. The second entry indicates that the WCD was at location 41.7054-88.0735 for 14,400 seconds (4 hours), and left this location 6,000 seconds (1 hour and 40 minutes) ago. The third entry indicates that the WCD was at location 41.7390-88.0540 for 60 seconds (1 minute), and left this location 86,000 seconds (24 hours) ago. In some cases, such a table may have more or fewer entries than three, and/or may contain more or less associated information.

Figure 6:
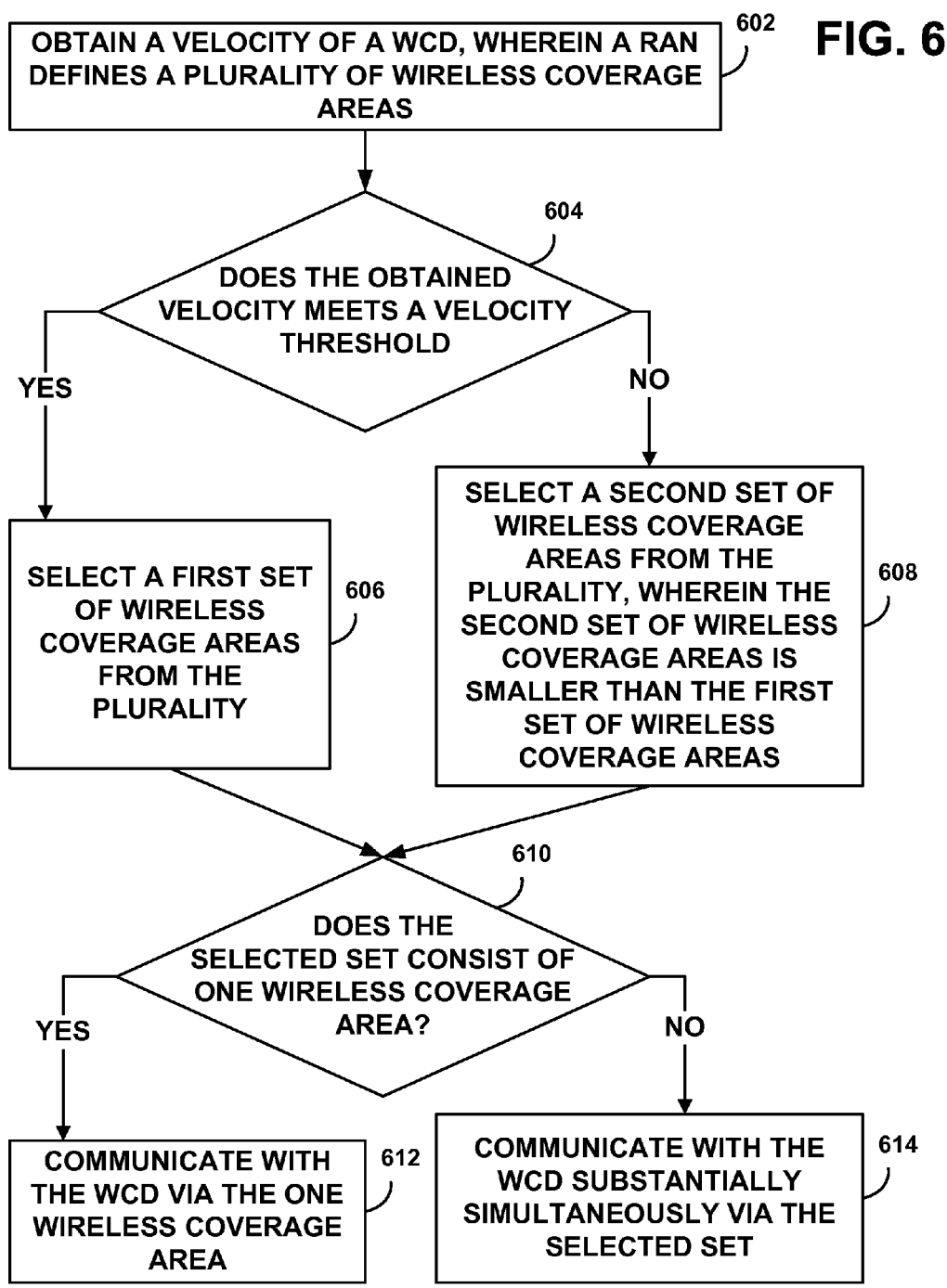
FIG. 6 is a first flow chart, in accordance with an example embodiment.
Figure 7:
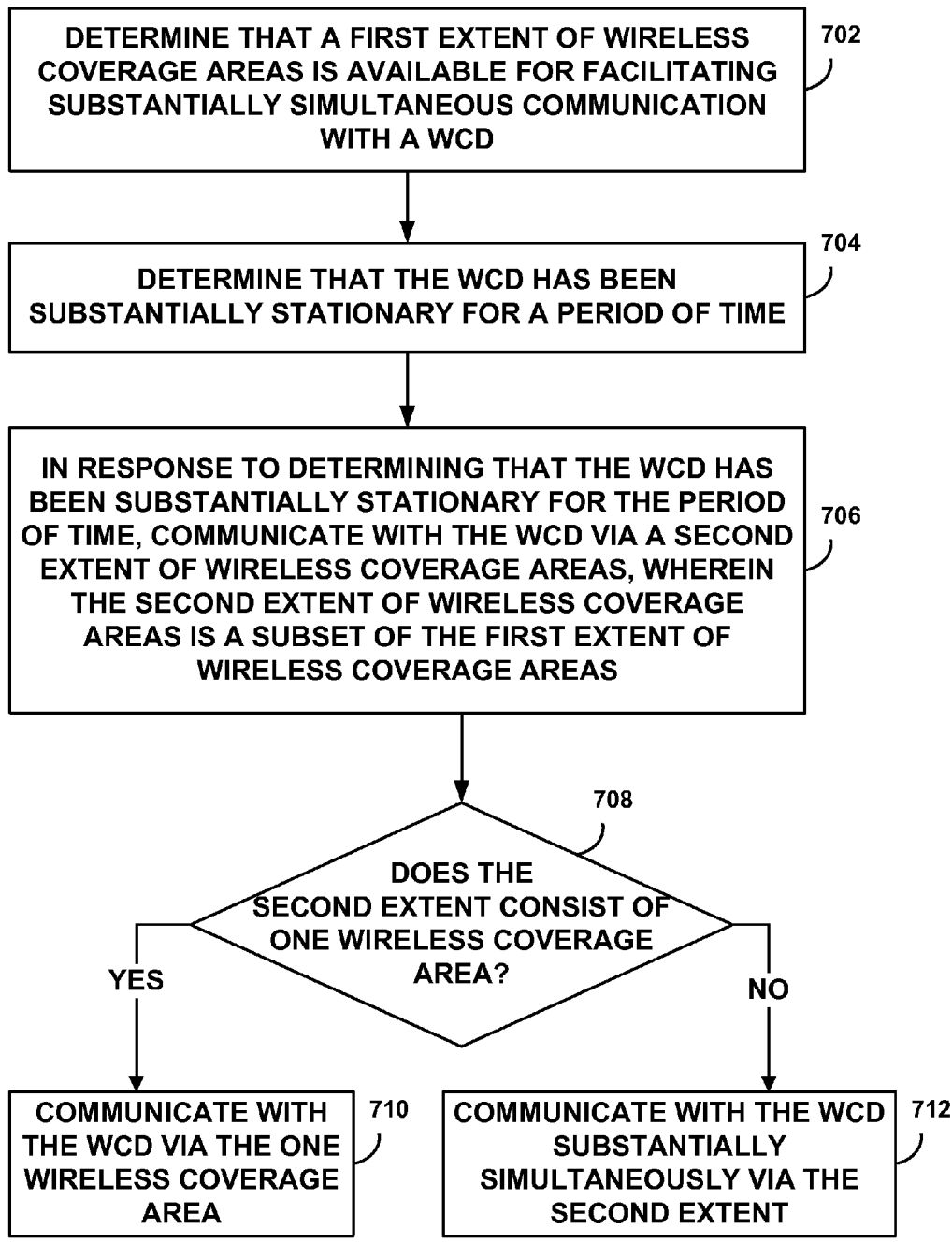
FIG. 7 is a second flow chart, in accordance with an example embodiment.

FIGS. 6 and 7 provide example embodiments through which a RAN component, such as a BSC, may communicate substantially simultaneously with a WCD based on the WCD's velocity and/or geographical location. At step 602 of FIG. 6, a RAN that defines a plurality of wireless coverage areas may obtain a velocity measurement of a WCD. At step 604, the RAN may determine whether the obtained velocity measurement meets a velocity threshold. If the obtained velocity measurement meets the velocity threshold, at step 606 the RAN may select a first set of wireless coverage areas from the plurality. However, if the obtained velocity measurement does not meet the velocity threshold, at step 608 the RAN may select a second set of wireless coverage areas from the plurality. The second set of wireless coverage areas may be smaller than the first set of wireless coverage areas.

The RAN may obtain the WCD's velocity and/or geographical location in a number of ways. For example, the WCD may be equipped with a GPS transceiver, or another type of geographical-location-determining and/or velocity-determining component. Periodically, or from time to time, the WCD may transmit its velocity and/or geographical location to the RAN, or to a server accessible to the RAN. Thus, the RAN may obtain the WCD's velocity and/or geographical location as needed from this server. On the other hand, the RAN may determine the WCD's geographical location through triangulation. For instance, at two or more BTSs, the RAN may measure the radial distance or the directionality of the signal received from the WCD. From these measurements, the WCD's geographical location can be estimated. By comparing two or more such measurements, the WCD's velocity can be estimated.

Then, at step 610, the RAN may determine whether the selected set of wireless coverage areas consists of one wireless coverage area. If the selected set of wireless coverage areas consists of one wireless coverage area, at step 612 the RAN may communicate with the WCD via the one wireless coverage area. But, if the selected set of wireless coverage areas consists of more than one wireless coverage area, at step 614 the RAN may communicate with the WCD substantially simultaneously via each wireless coverage area in the selected set.

In some possible embodiments, the RAN may have access to a list of geographical locations at which the WCD has previously remained substantially stationary. For instance, the RAN may determine a current geographical location of the WCD. Then, the RAN may determine that the current geographical location is within a geographical distance threshold (e.g., 100 meters, 1,000 meters, or 10,000 meters) of a geographical location in the list. The RAN may condition the selection of the second set of wireless coverage areas on the current geographical location being within the geographical distance threshold of the geographical location in the list. Additionally, the list of geographical locations may be indexed or sorted by lengths of time the WCD remained substantially stationary approximately at each respective geographical location in the list. Alternatively, the list of geographical locations may be indexed or sorted by how recently the WCD remained substantially stationary approximately at each respective geographical location in the list.

FIG. 7 illustrates another example embodiment in which a RAN may communicate substantially simultaneously with a WCD. At step 702, the RAN may determine that a first extent of wireless coverage areas is available for facilitating substantially simultaneous communication between the RAN and WCD. For instance, the first extent of wireless coverage areas may be wireless coverage areas from which the WCD receives pilot signals above a given strength. Alternatively, the first extent of wireless coverage areas may be wireless coverage areas within range of the WCD.

At step 704, the RAN may determine that the WCD has been substantially stationary for a period of time. Then, at step 706, in response to determining that the WCD has been substantially stationary for the period of time, the RAN may communicate with the WCD via a second extent of wireless coverage areas. The second extent of wireless coverage areas may be a subset of the first extent of wireless coverage areas. The period of time may take on a wide range of values, including values such as one second, one minute, ten minutes or longer.

Additionally, at step 708, the RAN may determine whether the second extent of wireless coverage areas consists of one wireless coverage area. If the second extent of wireless coverage areas consists of one wireless coverage area, at step 710 the RAN may communicate with the WCD via the one wireless coverage area. However, if the second extent of wireless coverage areas consists of more than one wireless coverage area, at step 712 the RAN may communicate with the WCD substantially simultaneously via each wireless coverage area in the second extent.

In some embodiments, determining that the WCD has been substantially stationary for the period of time may include determining that the WCD has been not been handed off between wireless coverage areas during the period of time. Alternatively or additionally, determining that the WCD has been substantially stationary for the period of time may include determining that the WCD is moving with a given velocity, and then determining that the given velocity is less than a velocity threshold. This velocity threshold can take on a wide range of possible values, such 1 mile per hour, 5 miles per hour, 10 miles per hour, and so on. As described above, the RAN may determine the given velocity from velocity and/or geographical location reported by the WCD, through BTS triangulation, or through some other means.

Further, the RAN may have access to a list of geographical locations at which the WCD has previously remained substantially stationary. Then, determining that the WCD has been substantially stationary for the period of time may involve determining that WCD has been substantially stationary in a given geographical location approximately at a geographical location in the list. Here, the RAN may presume that a WCD approximately at a geographical location in the list will like remain stationary while in this proximity.

For both of the first and second embodiments, communicating substantially simultaneously with the WCD may involve the RAN exchanging communications with the WCD, such that the communications traverse each of two or more wireless coverage areas at approximately the same time (e.g., the communications occurs within a few tens of milliseconds of one another or less).

This communication may take place during establishment of a call in which the WCD participates. For example, the RAN may transmit a respective channel assignment message to the WCD via each of several wireless coverage areas.

Alternatively or additionally, communicating substantially simultaneously with the WCD via multiple wireless coverage areas may involve the RAN assigning, to the WCD, a respective traffic channel from each of the second extent of wireless coverage areas. Then, during an initial portion of the call, the RAN may exchange bearer traffic with the WCD via each of the assigned traffic channels. This exchange of bearer traffic may involve the RAN transmitting and/or receiving identical copies of the same bearer traffic via each of the assigned traffic channels.

b. Based on Call Type

Real-time calls include calls that involve interactive and streamed voice, audio and/or video, such as voice over IP (VOIP) and push to talk, as well as online audio and video services. These types of calls are typically latency-sensitive, and may be bandwidth-sensitive as well. Further, the media exchanged between the participating entities in these types of calls is typically transmitted only once, as there is no time for retransmitting lost media. Thus, when the RAN fails to provide a real-time call with the resources needed to meet the call's quality requirements, the WCD's user may notice that the call's quality is impaired. For example, impairments that a user might notice in a VOIP call include clipped, distorted, or delayed audio, as well as call drops.

On the other hand, non-real-time calls include calls that involve non-interactive data transmissions and interactive data transmissions for which application response time can vary without disrupting the user's experience. These types of calls include web browsing, email, background file transfer, and so on. These types of calls are typically not as latency sensitive as real-time calls. Additionally, the media exchanged between the participating entities in these types of calls is typically retransmitted upon the detection of excessive delay or loss. Thus, even if the RAN provides a non-real-time call with less than an ideal amount of wireless resources, the WCD's user may not notice. Therefore, it may be advantageous for a RAN to allocate less wireless capacity and/or resources to non-real-time calls than to real-time calls.

Accordingly, another possible aspect of the embodiments herein is to determine whether a WCD is engaged in or is attempting to establish a non-real-time call. If this is the case, the RAN may reduce the extent of substantially simultaneous communication with the WCD in order to conserve wireless resources. On the other hand, if the WCD is engaged in or is attempting to establish a real-time call, the RAN may increase the extent of substantially simultaneous communication with the WCD in order to improve call quality. In doing so, the RAN may be able to reduce wireless resource utilization when the WCD is unlikely to benefit from substantially simultaneous communication, but increase the call quality for real-time calls.

The RAN may be able to determine the call type based on a service option that is associated with the request to establish the call. For example, in CDMA networks, a service option is associated with each traffic channel allocated to a WCD, and specifies the type of bearer data that is expected to traverse the traffic channel as well as the encoding that the RAN and WCD used to transmit this bearer data. Thus, in CDMA, service option 33 typically refers to traffic channels used for non-real-time media, while service options 62 and 63 typically refer to traffic channels used for variable-rate wideband speech. On the other hand, other techniques could be used instead of or in addition to examination of service options.

TABLE 2

Maximum number of wireless coverage areas per call type.

| Call Type | Maximum Number of Wireless Coverage Areas |
| --- | --- |
| Non-real-time | 1-2 |
| Real-time | No limit |

Table 2 provides examples of maximum number of wireless coverage areas for different call types. For non-real-time call types, the RAN may limit the extent of substantially simultaneous communication with the WCD to one or two wireless coverage areas. However, for real-time call types, the RAN might not limit the extent of substantially simultaneous communication with the WCD. Further, the number of wireless coverage areas available for substantially simultaneous communication may be limited by the number of wireless coverage areas in range of the WCD. Additionally, the RAN may condition the number of wireless coverage areas on other factors as well, such as the pilot signal strength the WCD receives from nearby wireless coverage areas, and the load on these wireless coverage areas. For example, if a WCD engaged in a non-real-time call reports that it receives pilot signals with low strengths from nearby wireless coverage areas, and/or if the nearby wireless coverage areas are lightly loaded, the RAN may use more than 1-2 wireless coverage areas for substantially simultaneous communication with the WCD.

Figure 8:
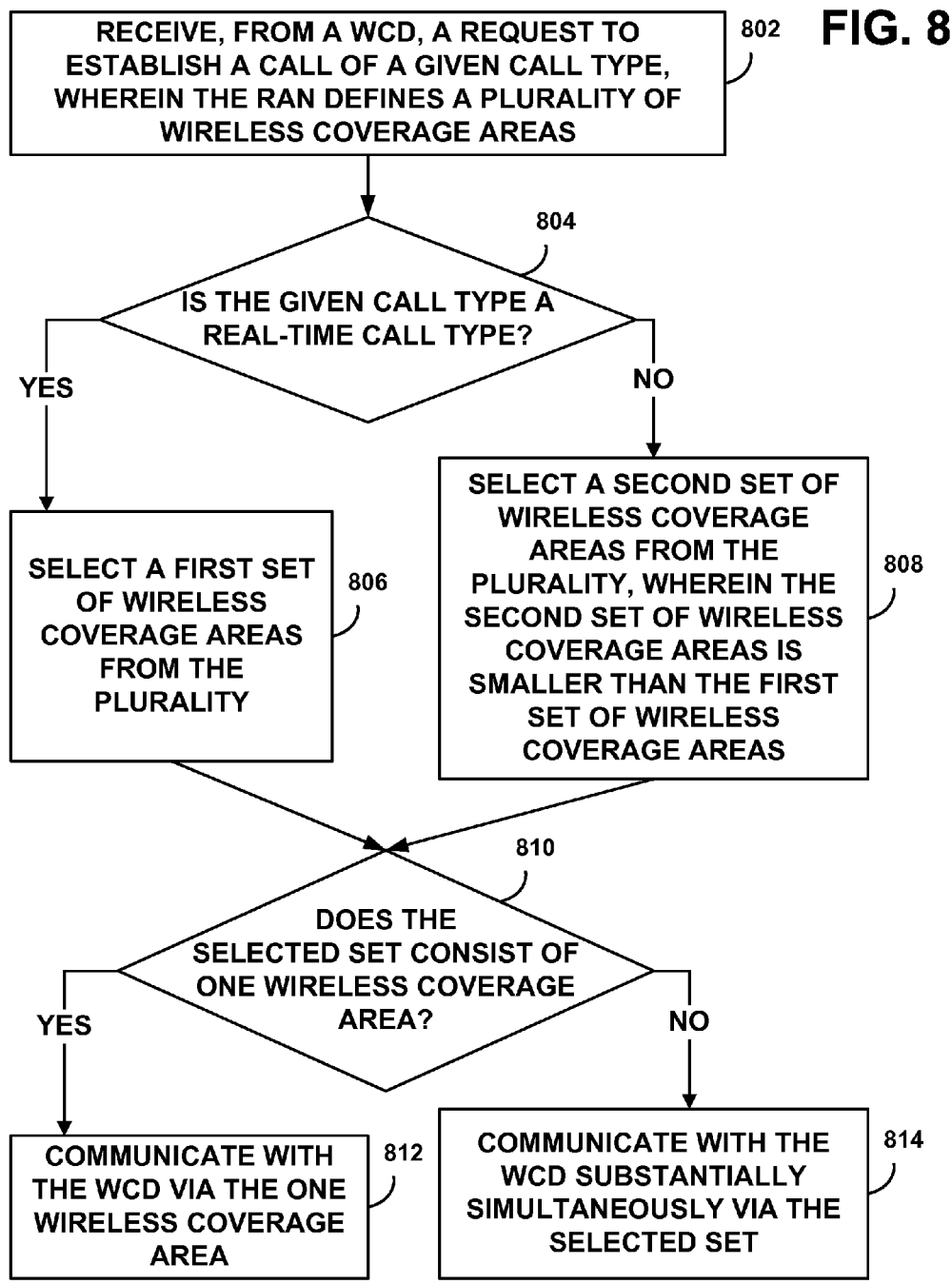
FIG. 8 is a third flow chart, in accordance with an example embodiment.
Figure 9:
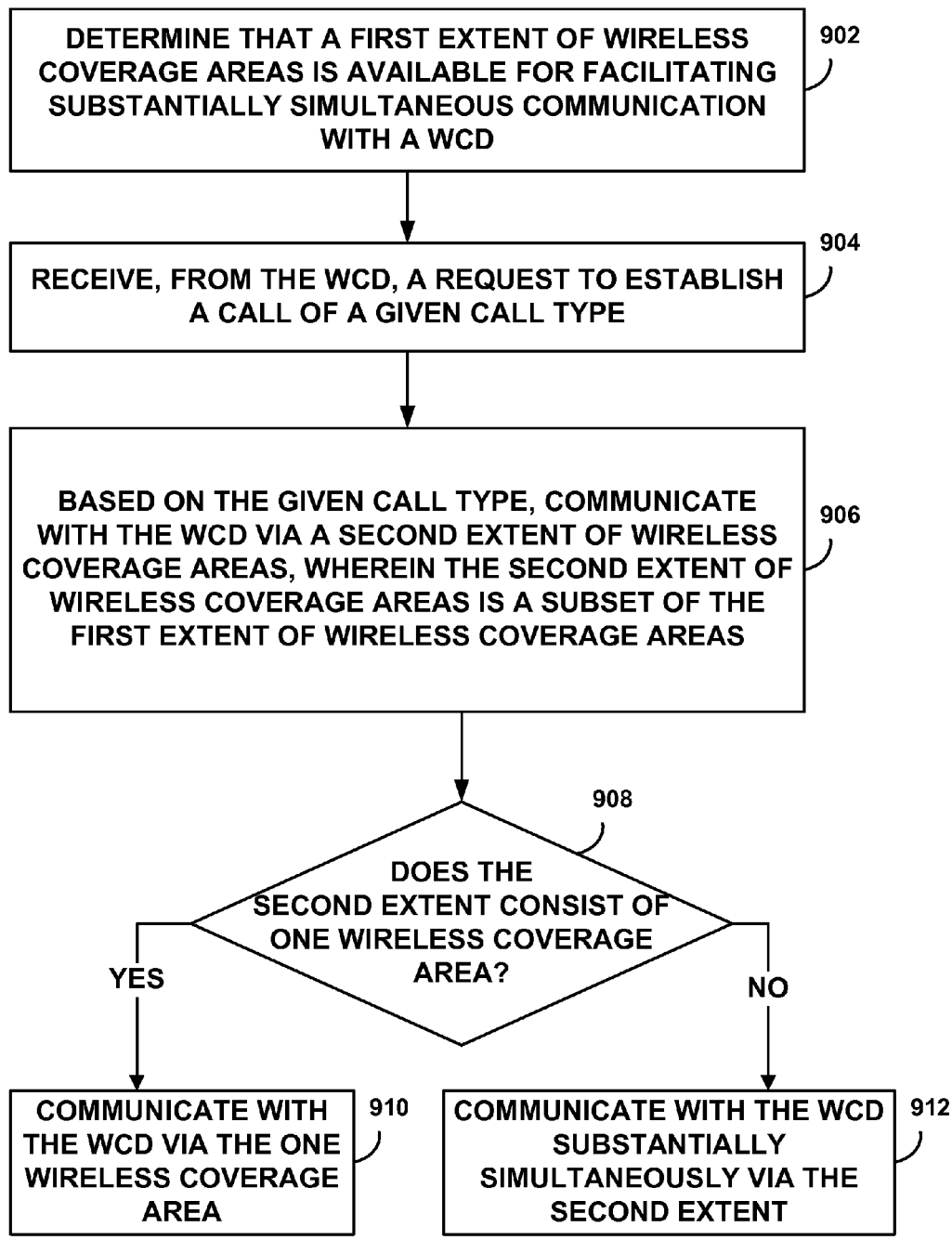
FIG. 9 is a fourth flow chart, in accordance with an example embodiment.

FIGS. 8 and 9 provide example embodiments through which a RAN component, such as a BSC, may communicate substantially simultaneously with a WCD based on the WCD's call type. At step 802 of FIG. 8, a RAN that defines a plurality of wireless coverage areas may receive, from a WCD, a request to establish a call of a given call type. At step 804, the RAN may determine whether the given call type is a real-time call type. This determination may be made based on a service option that is associated with the request to establish the call.

If the given call type is a real-time call type, then at step 806 the RAN may select a first set of wireless coverage areas from the plurality. However, if the given call type is not a real-time call type (e.g., the given call type is a non-real-time call type), then at step 808 the RAN may select a second set of wireless coverage areas from the plurality. The second set of wireless coverage areas may be smaller than the first set of wireless coverage areas.

Then, at step 810, the RAN may determine whether the selected set of wireless coverage areas consists of one wireless coverage area. If the selected set of wireless coverage areas consists of one wireless coverage area, then at step 812 the RAN may communicate with the WCD via the one wireless coverage area. But, if the selected set of wireless coverage areas consists of more than one wireless coverage area, then at step 814 the RAN may communicate with the WCD substantially simultaneously via each wireless coverage area in the selected set.

FIG. 9 illustrates another example embodiment in which a RAN may communicate substantially simultaneously with a WCD. At step 902, the RAN may determine that a first extent of wireless coverage areas is available for facilitating substantially simultaneous communication between the RAN and WCD. For instance, the first extent of wireless coverage areas may be wireless coverage areas from which the WCD receives pilot signals above a given strength. Alternatively, the first extent of wireless coverage areas may be wireless coverage areas within range of the WCD.

At step 904, the RAN may receive, from a WCD, a request to establish a call of a given call type. Then, at step 906, based on the given call type, the RAN may communicate with the WCD via a second extent of wireless coverage areas. The second extent of wireless coverage areas may be a subset of the first extent of wireless coverage areas.

The given call type may be a non-real-time call type. Particularly, the given call type may be a non-interactive, non-real-time call type. The call type may be determined based on a service option that is associated with the request to establish the call.

Additionally, at step 908, the RAN may determine whether the second extent of wireless coverage areas consists of one wireless coverage area. If the second extent of wireless coverage areas consists of one wireless coverage area, at step 910 the RAN may communicate with the WCD via the one wireless coverage area. However, if the second extent of wireless coverage areas consists of more than one wireless coverage area, at step 912 the RAN may communicate with the WCD substantially simultaneously via each wireless coverage area in the second extent.

For both of the third and fourth embodiments, communicating substantially simultaneously with the WCD may involve the RAN exchanging communications with the WCD, such that the communications traverse each of two or more wireless coverage areas at approximately the same time.

This communication may take place during establishment of a call in which the WCD participates. For example, the RAN may transmit a respective channel assignment message to the WCD via each of several wireless coverage areas.

Alternatively or additionally, communicating substantially simultaneously with the WCD via multiple wireless coverage areas may involve the RAN assigning, to the WCD, a respective traffic channel from each of the second extent of wireless coverage areas. Then, during an initial portion of the call, the RAN may exchange bearer traffic with the WCD via each of the assigned traffic channels. This exchange of bearer traffic may involve the RAN transmitting and/or receiving identical copies of the same bearer traffic via each of the assigned traffic channels.

It should be understood that FIGS. 6, 7, 8, and 9 depict non-limiting embodiments. Thus, more or fewer steps than shown in FIGS. 6, 7, 8, and 9 may be used without departing from the scope of the invention. Additionally, each of these steps may be repeated one or more times, or may be omitted altogether. Moreover, these steps may occur in a different order than shown in FIGS. 6, 7, 8, and 9. Further, the flow charts of these figures may be combined with one another, in whole or in part, also without departing from the scope of the invention. For instance, the number of wireless coverage areas that the RAN uses for substantially simultaneous communication with a WCD may be based on some combination of the WCD's velocity, location, and call type.

IV. Conclusion

Example embodiments have been described above. Those skilled in the art will understand, however, that changes and modifications may be made to these embodiments without departing from the true scope and spirit of the invention, which is defined by the claims.

The invention claimed is:

1. A method comprising:
a radio access network (RAN) receiving, from a wireless communication device (WCD), a request to establish a call of a given call type, wherein the RAN defines a plurality of wireless coverage areas, wherein the RAN determines the given call type based on a service option that is associated with the request to establish the call;
when the given call type is a real-time call type, the RAN selecting a first set of wireless coverage areas from the plurality;
when the given call type is a non-real-time call type, the RAN selecting a second set of wireless coverage areas from the plurality, wherein the second set of wireless coverage areas is smaller than the first set of wireless coverage areas;
when the selected set of wireless coverage areas consists of one wireless coverage area, the RAN communicating with the WCD via the one wireless coverage area; and
when the selected set of wireless coverage areas consists of more than one wireless coverage area, the RAN communicating with the WCD substantially simultaneously via each wireless coverage area in the selected set, wherein communicating substantially simultaneously via each wireless coverage area in the selected set comprises during establishment of a call in which the WCD participates, the RAN assigning, to the WCD, a respective traffic channel from each wireless coverage area in the selected set, and during an initial portion of the call, the RAN exchanging bearer traffic with the WCD via each of the assigned traffic channels.

2. The method of claim 1, wherein communicating substantially simultaneously via each wireless coverage area in the selected set comprises:
during establishment of a call in which the WCD participates, the RAN transmitting a respective channel assignment message to the WCD via each wireless coverage area in the selected set.

3. A method comprising:
a radio access network (RAN) determining that a first extent of wireless coverage areas is available for facilitating substantially simultaneous communication with a wireless communication device (WCD);
the RAN receiving, from the WCD, a request to establish a call of a non-real-time call type, wherein the RAN determines the non-real-time call type based on a service option that is associated with the request to establish the call; and
based on the non-real-time call type, the RAN communicating with the WCD via a second extent of wireless coverage areas, wherein the second extent of wireless coverage areas is a subset of the first extent of wireless coverage areas, wherein (i) when the second extent of wireless coverage areas consists of one wireless coverage area, the RAN communicates with the WCD via the one wireless coverage area, and (ii) when the second extent of wireless coverage areas consists of more than one wireless coverage area, the RAN communicates with the WCD substantially simultaneously via each wireless coverage area in the second extent, wherein communicating substantially simultaneously with the WCD via each wireless coverage area in the second extent comprises during establishment of a call in which the WCD participates, the RAN assigning, to the WCD, a respective traffic channel from each wireless coverage area in the second extent, and during an initial portion of the call, the RAN exchanging bearer traffic with the WCD via each of the assigned traffic channels.

4. The method of claim 3, wherein the non-real-time call type is a non-interactive non-real-time call type.

5. The method of claim 3, wherein communicating substantially simultaneously via each wireless coverage area in the second extent comprises:

the RAN exchanging communications with the WCD, wherein the communications traverse each wireless coverage area in the second extent at approximately the same time.

6. The method of claim 3, wherein communicating substantially simultaneously with the WCD via each wireless coverage area in the second extent comprises:

during establishment of a call in which the WCD participates, the RAN transmitting a respective channel assignment message to the WCD via each wireless coverage area in the second extent.

7. The method of claim 3, wherein the RAN transmits and receives identical copies of the same bearer traffic via each of the assigned traffic channels.

8. An article of manufacture including a non-transitory computer-readable medium, having stored thereon program instructions that, when executed by a radio access network (RAN), cause the RAN to perform operations comprising:

determining that a first extent of wireless coverage areas is available for facilitating substantially simultaneous communication with a wireless communication device (WCD);

receiving, from the WCD, a request to establish a call of a non-real-time call type, wherein the RAN determines the non-real-time call type based on a service option that is associated with the request to establish the call; and based on the non-real-time call type, communicating with the WCD via a second extent of wireless coverage areas, wherein the second extent of wireless coverage areas is a subset of the first extent of wireless coverage areas, wherein (i) when the second extent of wireless coverage areas consists of one wireless coverage area, the RAN communicates with the WCD via the one wireless coverage area, and (ii) when the second extent of wireless coverage areas consists of more than one wireless coverage area, the RAN communicates with the WCD substantially simultaneously via each wireless coverage area in the second extent, wherein communicating substantially simultaneously with the WCD via each wireless coverage area in the second extent comprises during establishment of a call in which the WCD participates, the RAN assigning, to the WCD, a respective traffic channel from each wireless coverage area in the second extent, and during an initial portion of the call, the RAN exchanging bearer traffic with the WCD via each of the assigned traffic channels.

9. The article of manufacture of claim 8, wherein the non-real-time call type is a non-interactive non-real-time call type.

10. The article of manufacture of claim 8, wherein communicating substantially simultaneously via each wireless coverage area in the second extent comprises:

exchanging communications with the WCD, wherein the communications traverse each wireless coverage area in the second extent at approximately the same time.

11. The article of manufacture of claim 8, wherein communicating substantially simultaneously with the WCD via each wireless coverage area in the second extent comprises:

during establishment of a call in which the WCD participates, the RAN transmitting a respective channel assignment message to the WCD via each wireless coverage area in the second extent.

12. The article of manufacture of claim 8, wherein the RAN transmits and receives identical copies of the same bearer traffic via each of the assigned traffic channels.

* * * * *